United States Patent [19]

Fujiwara et al.

[11] Patent Number: 4,617,563
[45] Date of Patent: Oct. 14, 1986

[54] LIQUID CRYSTAL DISPLAY DEVICE

[75] Inventors: Hitoshi Fujiwara; Yoshikiyo Futagawa, both of Shiojiri, Japan

[73] Assignee: Seiko Epson Kabushiki Kaisha, Tokyo, Japan

[21] Appl. No.: 565,545

[22] Filed: Dec. 27, 1983

[30] Foreign Application Priority Data

Dec. 28, 1982 [JP] Japan ................................ 57-234278

[51] Int. Cl.⁴ ............................................. G09G 3/36
[52] U.S. Cl. ..................................... 340/784; 340/703
[58] Field of Search ............... 340/759, 703, 784, 765; 350/333, 336

[56] References Cited

U.S. PATENT DOCUMENTS

| | | | |
|---|---|---|---|
| 3,807,831 | 4/1974 | Soref | 340/765 X |
| 3,916,393 | 10/1975 | Criscimagna et al. | 340/703 X |
| 4,231,640 | 11/1980 | Funada et al. | 340/784 X |
| 4,326,776 | 4/1982 | Banda | 340/784 X |
| 4,335,937 | 6/1982 | Takamatsu et al. | 340/784 X |
| 4,481,511 | 11/1984 | Hanmura et al. | 340/784 X |

Primary Examiner—Marshall M. Curtis
Assistant Examiner—Vincent P. Kovalick
Attorney, Agent, or Firm—Blum Kaplan Friedman Silberman & Beran

[57] ABSTRACT

A liquid crystal display device having a first transparent substrate, a second transparent substrate and a liquid crystal composition sandwiched between the first and second transparent substrates. The first transparent substrate has a plurality of first main electrodes and a plurality of first auxiliary electrodes extending from the first main electrodes. The second transparent substrate has a plurality of second main electrodes. The second main electrodes are positioned so that the second main electrodes have mutually confronting portions with the first main electrodes, defining main pixels therebetween, and with the first auxiliary electrodes defining auxiliary pixels therebetween. The presence of the liquid crystal composition between the first transparent substrate and the second transparent substrate in the regions of the main pixels and auxiliary pixels allow an image display in the main pixel and auxiliary pixel regions. Second auxiliary electrodes extending from the second main electrodes define further auxiliary pixels with the first main electrodes and still further auxiliary pixels with the first auxiliary electrodes.

22 Claims, 5 Drawing Figures

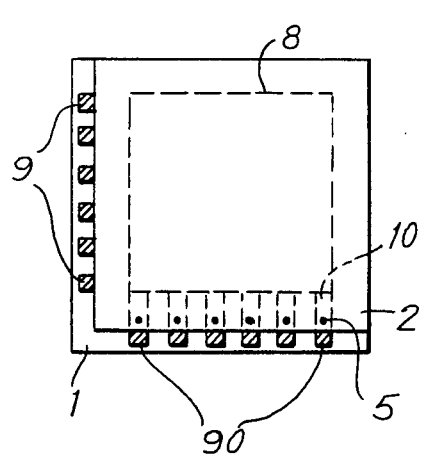
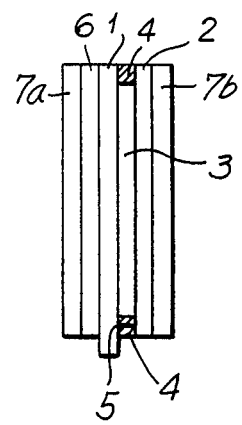
FIG.1a   FIG.1b
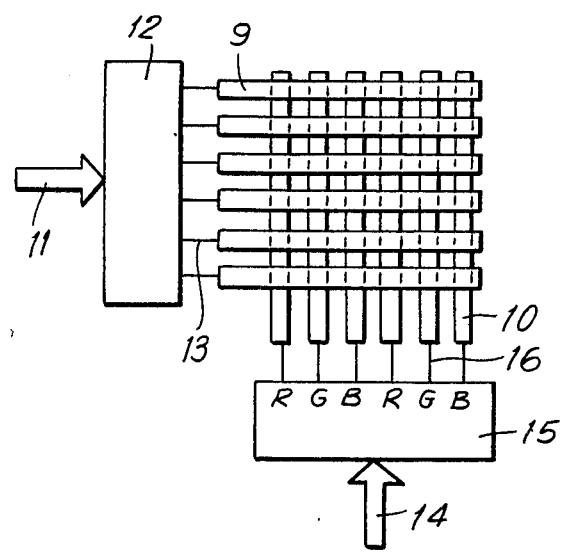
FIG.2

LIQUID CRYSTAL DISPLAY DEVICE

BACKGROUND OF THE INVENTION

The present invention is generally directed to liquid crystal display devices and, in particular, to a liquid crystal display device employing a novel electrode construction for achieving high-quality reproduction of video images without increasing the number of scanning lines. Heretofore, it has been conventional practice to display video signals on a cathode ray tube or liquid crystal display device by scanning only along effective scanning lines. However, the prior art faced the problem that when the display screen size was increased, the number of scanning lines was not likewise increased. This resulted in a greater distance between adjacent scanning lines and a loss of quality in the video image.

A television receiver using a cathode-ray tube capable of displaying high-quality images without changing broadcasting video systems has recently been developed. This television receiver stores video data representative of one frame. In addition to scanning the stored data, the device also scans the video data which is the average of the stored data for a line and the stored data for the next line of video data, the additionally scanned data representing the interpolated video data between the scanning lines. This type of television receiver requires a storage unit to rapidly store an entire frame of video data and an arithmetic unit for averaging the video data of each two adjacent transmitted scanning lines. Accordingly, a complex driver circuit is required which is expensive to construct.

It has also been proposed to construct a television receiver composed of a liquid crystal unit driveable in an X-Y matrix mode to achieve a high quality large screen video display. These television receivers experience many of the problems of the cathode-ray tube television receivers and various additional difficulties. For example, the connections between the electrodes for a matrix drive system and the connections between the electrodes and the external terminals are very complex. In addition, the driver circuit needed is complex and of an increased scale. However, the large screen resolution problem can be reduced in such liquid crystal television receivers by the arrangement in accordance with the invention.

SUMMARY OF THE INVENTION

Generally speaking, in accordance with the instant invention, a liquid crystal display device is provided. The liquid display device includes a first transparent substrate having thereon a plurality of first main electrodes and first auxiliary electrodes. The liquid crystal display device also includes a second transparent substrate having thereon a plurality of second main electrodes. A liquid crystal composition is sandwiched between the first and second transparent substrates. The second main electrodes are positioned in spaced relationship to the first transparent substrate so that the second main electrodes have mutually confronting positions with the first main electrode, defining main pixels, and have mutually confronting positions with the first auxiliary electrodes, defining auxiliary pixels therebetween. The presence of the liquid crystal composition between the first substrate and the second substrate in the regions of the main pixels and the auxiliary pixels allows an image to be displayed in the main pixel and auxiliary pixel regions.

Accordingly, it is an object of the instant invention to provide an improved liquid crystal display device.

Another object of the instant invention is to provide a liquid crystal display device capable of displaying high-quality images without changing the video signal scanning system and driver circuits used.

Another object of the instant invention is to provide an inexpensive liquid crystal display device employing a novel electrode construction for displaying high-quality images.

Yet another object of the instant invention is to provide a liquid crystal display device suitable for high-quality video images in a large screen application.

Still other objects and advantages of the invention will in part be obvious and will in part be apparent from the specification.

This invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1a is a front elevational view of a liquid crystal display device in accordance with the present invention;

FIG. 1b is a cross-sectional view of the liquid crystal display device shown in FIG. 1a;

FIG. 2 is a top plan view showing a liquid crystal device including the driver circuit in accordance with the present invention;

DESCRIPTION OF THE PREFERRED EMBODIMENT

Figure 3:
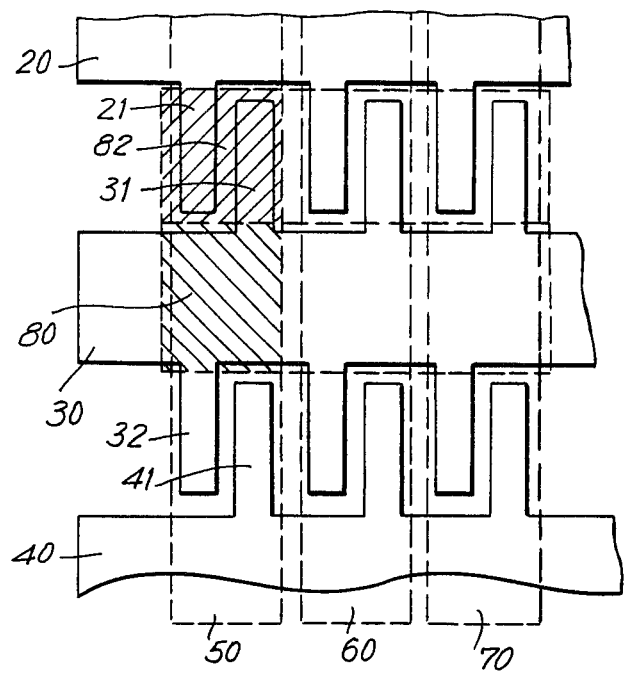
FIG. 3 is a fragmentary enlarged view illustrative of an electrode construction in accordance with an embodiment of the instant invention.

Throughout the specification, the term "main electrode" is used to indicate electrodes attached to a liquid crystal display device for driving the liquid crystal display device for image display and arranged in a substantially one-to-one correspondence to liquid crystal drive lines in a liquid crystal driver circuit. First and second main electrodes are held in confronting relation across a liquid crystal composition and cross each other in an X-Y array to define pixels. The term "main pixel" is employed to denote a pixel defined by the confronting portions of the first and second main electrodes. The term "auxiliary pixel" means a pixel defined by confronting portions of auxiliary electrodes extending from main electrodes on one substrate and main electrodes on the other substrate, disposed across the liquid crystal composition, or pixels defined by confronting portions of auxiliary electrodes extending from main electrodes on one substrate and auxiliary electrodes extending from main electrodes on the other substrate disposed across the liquid crystal composition. The term "auxiliary electrode" means electrodes extending from one main electrode on one substrate and cooperating with main electrodes on the other substrate disposed across the liquid crystal composition to define auxiliary pixels at mutually confronting portions, or electrodes extending from one main electrode on one substrate and cooperating with auxiliary electrodes extending from main electrodes on the other substrate disposed across the liquid crystal composition to define auxiliary pixels at mutually confronting areas. The auxiliary electrodes preferably extend toward the next adjacent main electrodes.

Reference is first made to FIGS. 1a and 1b, wherein a liquid crystal display device, constructed in accordance with the instant invention is depicted. The liquid crystal display device includes transparent substrate 1 having transparent electrodes 9 carried on the inner surface thereof and transparent substrate 2 having transparent electrodes 10 carried on the inner surface thereon in facing relation to transparent electrodes 9. A liquid crystal composition 3 is sandwiched between transparent substrates 1 and 2. The liquid crystal display device defines a matrix of picture elements or pixels. Liquid crystal composition 3 is sealed between substrates 1 and 2 by a sealing body 4 around the edges of the liquid crystal display device. Transparent electrodes 10 on transparent substrate 1 are coupled through conductive members 5 to transparent electrodes 90 on transparent substrate 1. Conductive members 5 and transparent electrodes 9 extend beyond sealing body 4 to provide terminal access to the liquid crystal display device.

The liquid crystal display device has an image formation zone 8 defined by the intersecting region of transparent electrodes 9 and 10. The liquid crystal display device also has a filter 6 composed of repetitive red, green and blue filter sections, for example, positioned in alignment with transparent electrodes 9 and 10 for producing colored images. Filter 6 is mounted on transparent substrate 1 remotely from liquid crystal composition 3. However, it may be disposed in liquid crystal composition 3. Where liquid crystal composition 3 is of the twisted nematic type, the liquid crystal display device has a pair of polarizers 7a and 7b on the outer surfaces of transparent substrates 1 and 2.

Reference is next made to FIG. 2 wherein a 6×6 matrix of pixels defined by transparent electrodes 9 and 10 in accordance with the instant invention is depicted, by way of example. The liquid crystal display device includes scanning circuit 12 for generating a scanning signal in response to clock signal 11. Scanning circuit 12 is connected to transparent electrodes 9 by lines 13. The liquid crystal display device also includes latch circuit 15 for latching data signal 14 generated by digitizing a video signal synchronized with the scanning signal. Latch circuit 15 is connected to transparent electrodes 10 by lines 16. Designated as R, G and B in latch circuit 15 are the colors red, green and blue to be displayed on the liquid crystal display device. In the color display mode, the 6×6 matrix display corresponds to a 6×2 color pixel matrix as a set of 3 pixels (1 red, 1 green and 1 blue) are required to define a color pixel.

The scanning signal generated by scanning circuit 12 in response to clock signal 11 is applied to transparent electrodes 9 via lines 13 for the successive scanning of each of electrodes 9 or the interlaced scanning of the electrodes 9 in each field. Data signal 14 is applied as a video signal to transparent electrodes 10. Latch circuit 15, which converts video image gradation into a data signal consisting of output time durations, synchronized with the scanning signal, applies the data signal to electrodes 10 through lines 16, thereby displaying a video image on image formation zone 8.

Reference is next made to FIG. 3, wherein a first embodiment of a liquid crystal display device in accordance with the present invention is depicted. The electrode construction includes first main electrodes 20, 30 and 40 mounted on first transparent substrate 1 and connected by lines 13 to scanning circuit 12. The electrode construction also includes second main electrodes 50, 60 and 70 mounted on second transparent substrate 2 and connected by lines 16 to latch circuit 15. FIG. 3 merely shows a small section of what would be a much larger matrix of electrode intersections in a working model television receiver. First and second electrodes 30 and 50 cross each other at a region serving as main pixel 80 capable of image display. There are as many such main pixels as the product of the number of first main electrodes 9 and the number of second main electrodes 10 (i.e., 6×6=36 main pixels in the embodiment of FIG. 2). First transparent substrate 1 also includes thereon first auxiliary electrodes 21 extending from first main electrode 20 toward the adjacent first main electrode 30, and first auxiliary electrodes 31 extending from first main electrode 30 toward the adjacent first main electrode 20, first auxiliary electrode 32 extending from first main electrode 30 toward the adjacent first main electrode 40, and first auxiliary electrode 41 extending from first main electrode 40 toward the adjacent first main electrode 30. Auxiliary electrodes 21, 31, 32 and 41 do not touch the adjacent main electrodes or auxiliary electrodes, the gap therebetween being sufficient for proper operation. First auxiliary electrode 21, first auxiliary electrode 31 and second main electrode 50 cross each other in confronting relation to jointly provide a first auxiliary pixel 82 capable of image display and disposed between main pixels 80. First auxiliary electrodes 21 and 31 have substantially the same areas and extend alternately in side by side relation from first main electrodes 20 and 30. First main electrode 30 has first auxiliary electrodes 31 and 32 extending towards first main electrodes 20 and 40 respectively, located one on each side of first main electrode 30. A plurality of first auxiliary pixels 82 are defined by auxiliary electrodes between each pair of adjacent main electrodes 20, 30, 40, in registration with main electrodes 50 and 60.

When a scanning signal is applied to first main electrode 20, image data is displayed on confronting crossing portions (main pixels) of first main electrode 20 and second main electrodes 50, 60, 70. At the same time, the same image data as is displayed on main electrode 20 is displayed on the confronting crossing portions (substantially one-half of first auxiliary pixel 82), of first auxiliary electrodes 21 and second main electrodes 50, 60 and 70. When a scanning signal is applied to first main electrode 30, image data is displayed on the confronting crossing portions (main pixels 80), of first main electrode 30 and second main electrode 50, 60 and 70. At the same time, the same image data as displayed on main electrode 30 is also displayed on confronting crossing portions (substantially one-half of first auxiliary pixel 82), of first auxiliary electrode 31 and second main electrode 50, 60 and 70. Thus, first auxiliary pixels 82 can display an image which is the average of the image displayed by first main electrode 20 and the image displayed by first main electrode 30. The electrode construction therefore enables the viewer to see any image as if it were displayed by a system having twice as many scanning lines as are actually present.

Figure 4:
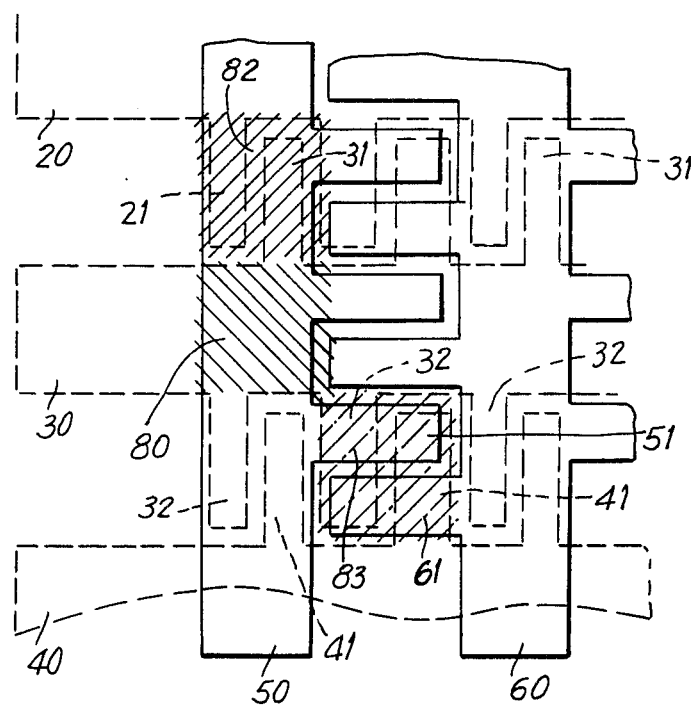
FIG. 4 is a fragmentary enlarged view illustrative of an electrode construction in accordance with a second embodiment of the instant invention.

Reference is next made to FIG. 4, wherein a second embodiment of a liquid crystal display device in accordance with the present invention is depicted, like reference numerals being used for like elements. The electrode construction includes first main electrodes 20, 30 and 40 mounted on first transparent substrate 1 and connected to scanning circuit 12 by lines 13. It also includes second main electrodes 50 and 60 mounted on second transparent substrate 2 and connectable to latch circuit 15 by lines 16 (FIG. 2). The first and second main electrodes cross each other at portions serving as main pixels 80 capable of image display. First auxiliary pixel 82 is formed jointly by the confronting crossing portions of first auxiliary electrode 21 and first auxiliary electrode 31 with second main electrode 50. First auxiliary pixel 82 operates in the same manner as does first auxiliary pixel 82 as described with respect to the first embodiment.

Transparent substrate 2 supports thereon second auxiliary electrode 51 extending from second main electrode 50 toward the adjacent second main electrode 60. Second auxiliary electrode 61 extends from second main electrode 60 towards the adjacent second main electrode 50. Second auxiliary electrodes 51 and 61, which extend from second main electrodes 50 and 60 do not, however, touch the adjacent main electrodes 60 and 50 respectively. Second auxiliary electrodes 51 and 61 cross first auxiliary electrodes 32 and 41 in confronting relation across liquid crystal composition 3 at portions serving as second auxiliary pixel 83. A plurality of second auxiliary pixels 83 are defined by auxiliary electrodes between each pair of adjacent main electrodes 50, 60 in registration with the gap between adjacent main electrodes 20, 30, 40, and between adjacent first auxiliary pixels 82.

Second auxiliary pixels 83 are responsive to scanning signals applied to first main electrodes 30 and 40 and data signals applied to second main electrodes 50 and 60 for displaying images which are the average of images displayed by first main electrodes 30 and 40 and second main electrodes 50 and 60.

The additional images displayed by first and second auxiliary pixels 82 and 83 enable the viewer to see the overall image as if displayed by about four times the actual number of main pixels.

While auxiliary electrodes 21, 31, 41, 51 and 61 are rectangular in shape in the illustrative embodiments, they may be other shapes and arrangements with the same results. The electrodes to which the scanning circuit and latch circuit are coupled may be switched. Images of high quality can be displayed by providing auxiliary electrodes between adjacent main electrodes irrespective as to how the main electrodes are arranged as scanning or signal electrodes.

A liquid crystal display device, as constructed in accordance with the present invention provides great benefits by allowing inexpensive liquid crystal display devices to be produced which are capable of high-quality video image display without changing or adding scanning systems and driver circuits. Moreover, when colored filters are added corresponding to the respective pixels of the liquid crystal display device, it is possible to display a colored image such as that in a color television image. If no filter, or a single color filter, is present, a monochrome display is obtained.

It will thus be seen that the objects set forth above, among those made apparent from the preceding description, are efficiently attained and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A liquid crystal display device comprising:
   a first transparent substrate having thereon a plurality of first main electrodes and a plurality of first auxiliary electrodes each extending from one of said first main electrodes;
   a second transparent substrate positioned in spaced relationship to the first transparent substrate and having thereon a plurality of second main electrodes in facing relation to said first main electrodes and said first auxiliary electrodes, so that the second main electrodes have mutually confronting portions with the first main electrodes defining main pixels therebetween, and with the first auxiliary electrodes defining auxiliary pixels therebetween;
   a liquid crystal composition maintained between said first and second transparent substrates; and
   driving means for applying driving signals to the first and second main electrodes;
   whereby the application of driving signals to the first and second main electrodes and the presence of the liquid crystal composition between the first substrate and the second substrate in the regions of the main pixels and the auxiliary pixels allows an image display in the main pixel and auxiliary pixel regions.

2. A liquid crystal display device as claimed in claim 1, wherein said first auxiliary electrodes extend from each first main electrode toward each adjacent first main electrode.

3. A liquid crystal display device as claimed in claim 2, wherein each auxiliary pixel is defined by a first auxiliary electrode extending from one first main electrode toward an adjacent first main electrode and a first auxiliary electrode extending from said adjacent first main electrode toward said one first main electrode.

4. A liquid crystal display device as claimed in claim 3, wherein the first auxiliary electrodes defining an auxiliary pixel are each essentially rectangular in shape and positioned side by side.

5. A liquid crystal display device as claimed in claim 4, wherein said first main electrodes extend at essentially right angles to said second main electrodes, each said first main electrode being an elongated electrode extending in spaced relation to the other first main electrodes, each said second main electrode being an elongated electrode extending in spaced relation to the other second main electrodes.

6. A liquid crystal display device as claimed in claim 5, further including a plurality of second auxiliary electrodes, each extending from one of said second main electrodes and carried by the second transparent substrate, the second auxiliary electrodes being positioned in spaced facing relationship to the first main electrodes and the first auxiliary electrodes so as to have mutually confronting portions with the first main electrodes defining secondary auxiliary pixels therebetween, and with the first auxiliary electrodes defining tertiary auxiliary pixels therebetween;

whereby the application of the driving signals to the first and second main electrodes and the presence of the liquid crystal composition between the first substrate and the second substrate in the regions of the main pixels and the auxiliary, secondary auxiliary and tertiary auxiliary pixels allow an image display in the main pixel and the auxiliary, secondary auxiliary and tertiary auxiliary pixel regions.

7. A liquid crystal display device as claimed in claim 6, wherein said second auxiliary electrodes extend from each second main electrode toward each adjacent second main electrode.

8. A liquid crystal display device as claimed in claim 7, wherein each of the secondary and tertiary auxiliary pixels is defined by a second auxiliary electrode extending from one second main electrode toward an adjacent second main electrode and a second auxiliary electrode extending from said adjacent second main electrode toward said one second main electrode, the tertiary auxiliary pixels being further defined by a first auxiliary electrode extending from one first main electrode toward an adjacent main electrode and a first auxiliary electrode extending from said adjacent first main electrode toward said one first main electrode.

9. A liquid crystal display device as claimed in claim 8 wherein the two second auxiliary electrodes defining each secondary and tertiary auxiliary pixel are essentially rectangular in shape and positioned side by side and the two first auxiliary electrodes defining a tertiary auxiliary pixel are essentially rectangular in shape and positioned side by side.

10. A liquid crystal display device as claimed in claim 1, further including a plurality of second auxiliary electrodes each extending from one of said second main electrodes and carried by the second transparent substrate, the second auxiliary electrodes being positioned in spaced facing relationship to the first main electrodes and the first auxiliary electrodes so as to have mutual confronting portions with the first main electrodes, defining secondary auxiliary pixels therebetween, and with the first auxiliary electrodes defining tertiary auxiliary pixels therebetween;

whereby the application of driving signals to the first and second main electrodes and the presence of the liquid crystal composition between the first substrate and the second substrate in the regions of the main pixels and the auxiliary, secondary auxiliary and tertiary auxiliary pixels allow an image display in the main pixel and the auxiliary secondary auxiliary and tertiary auxiliary pixel regions.

11. A liquid crystal display device as claimed in claim 10, wherein said second auxiliary electrodes extend from each second main electrode toward each adjacent second main electrode.

12. A liquid crystal display device as claimed in claim 11, wherein each secondary and tertiary auxiliary pixel is defined by a second auxiliary electrode extending from one second main electrode toward an adjacent second main electrode and a second auxiliary electrode extending from said adjacent second main electrode toward said one second main electrode, the tertiary auxiliary pixels being further defined by a first auxiliary electrode extending from one first main electrode toward an adjacent first main electrode and a first auxiliary electrode extending from said adjacent first main electrode toward said one first main electrode.

13. A liquid crystal display device as claimed in claim 12, wherein the two second auxiliary electrodes defining each secondary and tertiary auxiliary pixel are essentially rectangular in shape and positioned side by side and the two first auxiliary electrodes defining a tertiary auxiliary pixel are essentially rectangular in shape and positioned side by side.

14. A liquid crystal display device as claimed in claim 10, wherein the first auxiliary electrodes each occupies an area slightly less than one half of the area between adjacent main pixels.

15. A liquid crystal display device as claimed in claim 10, wherein each said first auxiliary electrode and each said second auxiliary electrode occupies an area slightly less than one half the area between adjacent main pixels.

16. A liquid crystal display device as claimed in claim 1, wherein each of the first auxiliary electrodes occupies an area slightly less than one half of the area between adjacent main pixels.

17. A liquid crystal display device as claimed in claim 6, wherein each said first auxiliary electrode and each said second auxiliary electrode occupies an area slightly less than one half the area between adjacent main pixels.

18. A liquid crystal display device as claimed in claim 1, wherein a display is achieved by said driving means applying scanning signals to one of said first and second main electrodes, and data signals corresponding to said scanning signals to the other of said first and second main electrodes.

19. A liquid crystal display device as claimed in claim 18, wherein an auxiliary pixel disposed between two adjacent main pixels displays an image which is an average of images displayed by said two adjacent main pixels.

20. A liquid crystal display device as claimed in claim 1, wherein the driving means includes a driving circuit and the driving signals substantially correspond in number to the main electrodes and are applied from the driving circuit to display areas for displaying images.

21. A liquid crystal display device as claimed in claim 20, wherein the number of pixels displayed is approximately n times (where n is one of 2, 3 and 4) as many as the product of the number of the first and second main electrodes.

22. A liquid crystal display device as claimed in claim 1, wherein predetermined driving signals are applied to the first and second main electrodes so that the main and auxiliary pixels cooperate with each other at the same time in displaying images.

* * * * *